US008903454B2

(12) United States Patent
Lee et al.

(10) Patent No.: US 8,903,454 B2
(45) Date of Patent: Dec. 2, 2014

(54) BASE STATION AND RADIO UNIT FOR CREATING OVERLAID SECTORS WITH CARRIER AGGREGATION

(75) Inventors: Jung A. Lee, Pittstown, NJ (US); Denis Fauconnier, Chevreuse (FR); James P. Seymour, North Aurora, IL (US)

(73) Assignee: Alcatel Lucent, Boulogne-Billancourt (FR)

( * ) Notice: Subject to any disclaimer, the term of this patent is extended or adjusted under 35 U.S.C. 154(b) by 66 days.

(21) Appl. No.: 13/290,676

(22) Filed: Nov. 7, 2011

(65) Prior Publication Data

US 2013/0116011 A1    May 9, 2013

(51) Int. Cl.
| | |
|---|---|
| *H04M 1/00* | (2006.01) |
| *H04W 16/28* | (2009.01) |
| *H01Q 1/24* | (2006.01) |
| *H01Q 3/28* | (2006.01) |

(52) U.S. Cl.
CPC .............. *H04W 16/28* (2013.01); *H01Q 1/246* (2013.01); *H01Q 3/28* (2013.01)
USPC ....................................... 455/561; 455/562.1

(58) Field of Classification Search
CPC ......... H04W 16/28; H01Q 1/246; H01Q 3/28
USPC ...................... 455/63.2, 444–449, 456.1–457, 455/561–562.1
See application file for complete search history.

(56) References Cited

U.S. PATENT DOCUMENTS

| | | | |
|---|---|---|---|
| 6,151,310 A * | 11/2000 | Dent ............................... 370/330 |
| 6,181,276 B1 * | 1/2001 | Schlekewey et al. .......... 342/372 |
| 6,268,828 B1 * | 7/2001 | Martek ........................... 342/373 |
| 6,311,075 B1 * | 10/2001 | Bevan et al. ................ 455/562.1 |
| 6,400,335 B1 * | 6/2002 | Weaver et al. ................. 343/853 |
| 7,242,362 B2 * | 7/2007 | Hulkkonen et al. ........... 343/853 |
| 7,428,428 B2 * | 9/2008 | Wong et al. ................. 455/562.1 |
| 8,169,933 B2 * | 5/2012 | Srinivasan et al. ............ 370/253 |
| 8,229,506 B2 * | 7/2012 | Duet et al. ................. 455/562.1 |
| 2002/0086708 A1 * | 7/2002 | Teo et al. ....................... 455/561 |
| 2003/0068612 A1 * | 4/2003 | Vidal et al. ......................... 435/4 |
| 2003/0162545 A1 * | 8/2003 | Csapo et al. ................... 455/446 |
| 2003/0195017 A1 * | 10/2003 | Chen et al. ................. 455/562.1 |
| 2004/0162115 A1 * | 8/2004 | Smith et al. ................ 455/562.1 |
| 2004/0224637 A1 * | 11/2004 | Silva et al. ..................... 455/63.4 |
| 2005/0088338 A1 * | 4/2005 | Masenten et al. ............. 342/368 |
| 2005/0261028 A1 * | 11/2005 | Chitrapu ..................... 455/562.1 |
| 2006/0052139 A1 * | 3/2006 | Teo et al. ................... 455/562.1 |
| 2006/0181461 A1 * | 8/2006 | Leeper et al. ........... 343/700 MS |
| 2006/0252461 A1 * | 11/2006 | Grant et al. ................ 455/562.1 |
| 2007/0275761 A1 * | 11/2007 | Jin et al. ..................... 455/562.1 |

(Continued)

*Primary Examiner* — Simon Nguyen

(74) *Attorney, Agent, or Firm* — Harness Dickey & Pierce

(57) ABSTRACT

The embodiments relate to a base station and/or radio unit for creating overlaid sectors with carrier aggregation. The radio unit includes a first antenna array including a plurality of first antenna elements. The plurality of first antenna elements are arranged to provide wireless coverage for user equipments on a first frequency carrier in a first coverage area of a cell site. The radio unit also includes a second antenna array including a plurality of second antenna elements. The plurality of second antenna elements are arranged to create at least one sector for providing wireless coverage for the user equipments on a second frequency carrier in a second coverage area within the first coverage area. The radio unit also includes a central unit configured to dynamically adjust one of a location of the second coverage area within the first coverage area and a size of the second coverage area.

18 Claims, 3 Drawing Sheets

(56) References Cited

U.S. PATENT DOCUMENTS

| | | | |
|---|---|---|---|
| 2008/0057978 A1* | 3/2008 | Karaoguz et al. | 455/456.3 |
| 2009/0023477 A1* | 1/2009 | Staudte | 455/562.1 |
| 2010/0081439 A1* | 4/2010 | Sie et al. | 455/436 |
| 2010/0119002 A1* | 5/2010 | Hartenstein | 375/267 |
| 2011/0085492 A1* | 4/2011 | Kim et al. | 370/328 |
| 2012/0129575 A1* | 5/2012 | Kenington | 455/561 |
| 2012/0276901 A1* | 11/2012 | Kruglick | 455/436 |
| 2013/0053018 A1* | 2/2013 | Kruglick | 455/422.1 |

* cited by examiner

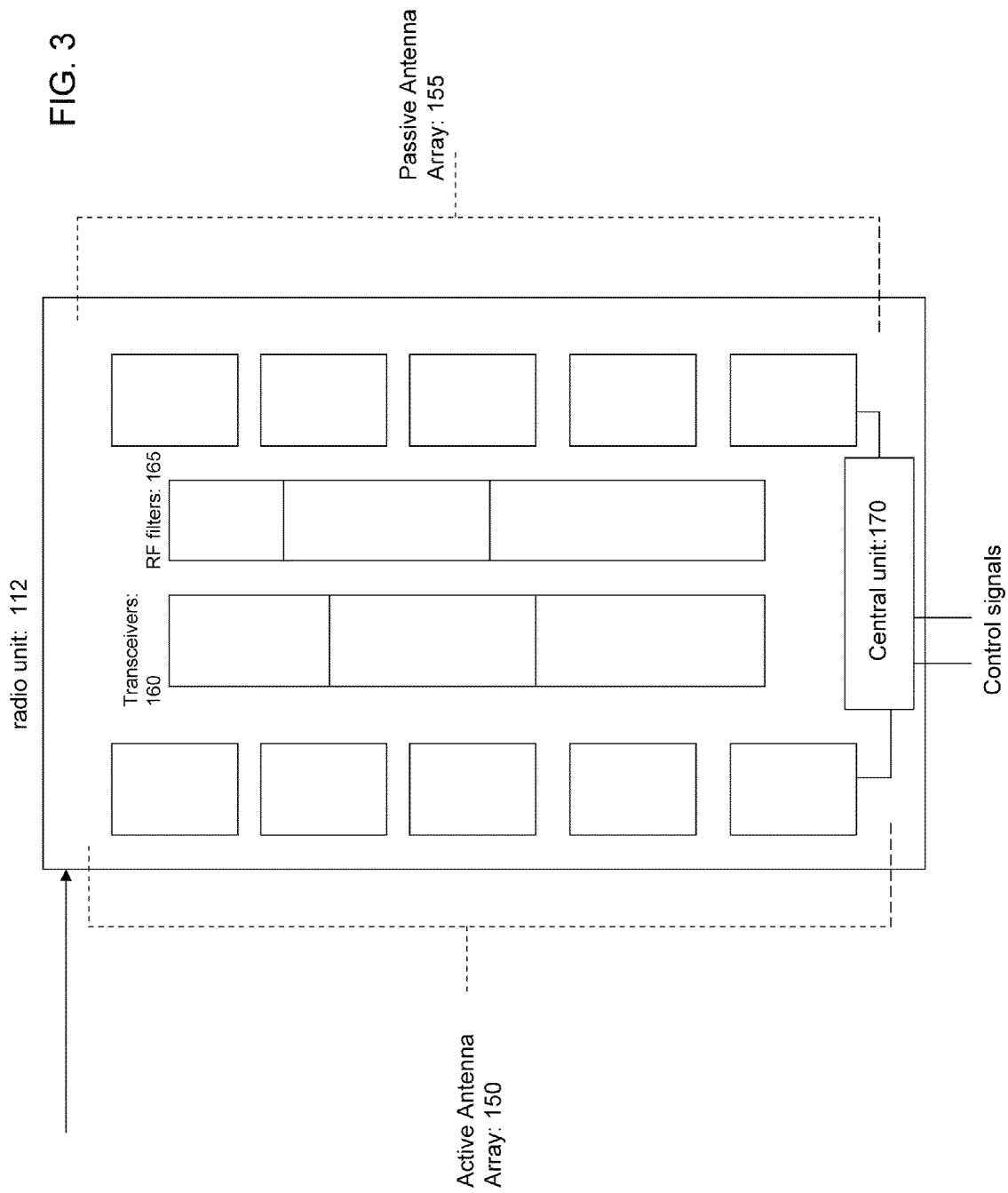

BASE STATION AND RADIO UNIT FOR CREATING OVERLAID SECTORS WITH CARRIER AGGREGATION

BACKGROUND

Phased antenna arrays have been used in radar for a relatively long time for military communications and imaging systems. With recent advances in hardware design, inexpensive and small form-factor active antenna array (AAA) design for mass deployment is becoming reality. Particularly, modular antenna design with integrated Radio Frequency (RF) transceivers allows stacking the antenna elements flexibly to form an array for any geometry, size and power output required. For example, a vertical antenna array, which includes antenna elements arranged in a vertical structure, may be used for macro-cell deployment. Also, square or rectangular arrays are ideally suited for installation in building facades and bus stations. Circular arrays with omni or directional elements are suited for installations on lamp posts. Single or two antenna elements can be used for distributed antenna subsystem (DAS) replacement in campuses, stadiums, or indoor deployments.

This innovation in radio design changes the paradigm of cellular network deployment from a conventional fixed cellular network to a heterogeneous network with a mixture of small and larger cells. Advanced interference management and improvement in network operational efficiency are becoming more important in such network deployments.

In a conventional network, the antenna tilt and the pilot power are configured statically or semi-statically to ensure radio coverage during installation and by drive-test. However, this effort is time-consuming and not optimal, when traffic loading varies dynamically. For example, the antenna tilt is varied mechanically or electronically to optimize the coverage in a static or semi-static manner; however this not optimal when the traffic loading changes.

SUMMARY

The embodiments relate to a base station and/or radio unit for creating overlaid sectors with carrier aggregation.

The embodiments provide a radio unit for supporting dual bands. The radio unit includes a first antenna array including a plurality of first antenna elements. The plurality of first antenna elements are arranged to provide wireless coverage for user equipments on a first frequency carrier in a first coverage area of a cell site. The radio unit also includes a second antenna array including a plurality of second antenna elements. The plurality of second antenna elements are arranged to create at least one sector for providing wireless coverage for the user equipments on a second frequency carrier in a second coverage area within the first coverage area. The radio unit also includes a central unit configured to dynamically adjust one of a location of the second coverage area within the first coverage area and a size of the second coverage area.

The central unit dynamically adjusts the location of the second coverage area within the first coverage area based on at least one control signal. The at least one control signal includes adjustment information indicating an adjustment to at least one antenna parameter of the second antenna array. The at least one parameter includes tilt, azimuth angle, and antenna pattern of the second antenna elements.

The central unit dynamically adjusts the size of the second coverage area based on at least one control signal. The at least one control signal includes adjustment information indicating an adjustment to a pilot power of the at least one sector.

In one embodiment, the plurality of second antenna elements are arranged to create a plurality of sectors. Each sector provides non-overlapping wireless coverage for the user equipments on the second frequency carrier in a corresponding second coverage area within the first coverage area. Each sector of the plurality of sectors has a same cell identification number.

In one embodiment, the first antenna array transmits control signals using the first frequency carrier and the second antenna array transmits data signals using the second frequency carrier for the user equipments in the second coverage area.

The radio unit may also include a baseband unit configured to determine an adjustment to at least one antenna parameter of the first antenna array based on traffic distribution in the cell site and transmit adjustment information to the central unit. The adjustment information indicates the adjustment to at least one antenna parameter. The central unit dynamically adjusts one of the location of the second coverage area within the first coverage area and the size of the second coverage area based on the adjustment information.

The second frequency carrier may be higher than the first frequency carrier, the first antenna array may be a passive antenna array, and the second antenna array may be an active antenna array.

The embodiment include a base station for carrier aggregation. The base station includes a radio unit. The radio unit includes a first antenna array including a plurality of first antenna elements. The plurality of first antenna elements are arranged to provide wireless coverage for user equipments on a first frequency carrier in a first coverage area of a cell site. The radio unit includes a second antenna array including a plurality of second antenna elements. The plurality of second antenna elements are arranged to create at least one sector for providing wireless coverage for the user equipments on a second frequency carrier in a second coverage area within the first coverage area. The base station includes a baseband unit configured to dynamically adjust one of a location of the second coverage area within the first coverage area and a size of the second coverage area.

The base station includes an interface between the baseband unit and the second antenna array for transmitting adjustable antenna parameters to the radio unit for the dynamic adjustment.

The baseband unit may be configured to dynamically adjust one of the location of the second coverage area within the first coverage area and the size of the second coverage area based on monitoring information. The monitoring information indicates traffic distribution in the cell site.

Also, the baseband unit may be configured to aggregate the first frequency carrier with the second frequency carrier in an overlapping area between the first coverage area and the second coverage area.

The baseband unit may be configured to dynamically adjust the location of the second coverage area within the first coverage area by adjusting at least one antenna parameter of the second antenna array. The at least one parameter includes tilt, azimuth angle, and antenna pattern of the second antenna elements.

The baseband unit may be configured to determine an adjustment to at least one antenna parameter of the second antenna array, and transmit adjustment information indicating the adjusted at least one antenna parameter to the radio unit.

In one embodiment, the plurality of second antenna elements are arranged to create a plurality of sectors. Each sector provides non-overlapping wireless coverage for the user equipments on the second frequency carrier in a corresponding second coverage area within the first coverage area. Each sector of the plurality of sectors has a same cell identification number.

In one embodiment, the radio unit transmits control signals using the first frequency carrier and the radio unit transmits data signals using the second frequency carrier for the user equipments in the second coverage area.

The second frequency carrier may be higher than the first frequency carrier, the first antenna array may be a passive antenna array, and the second antenna array may be an active antenna array.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of the embodiments, and wherein:

FIG. 3 illustrates the radio unit according to an example embodiment.

DETAILED DESCRIPTION OF EXAMPLE EMBODIMENTS

Figure 1:
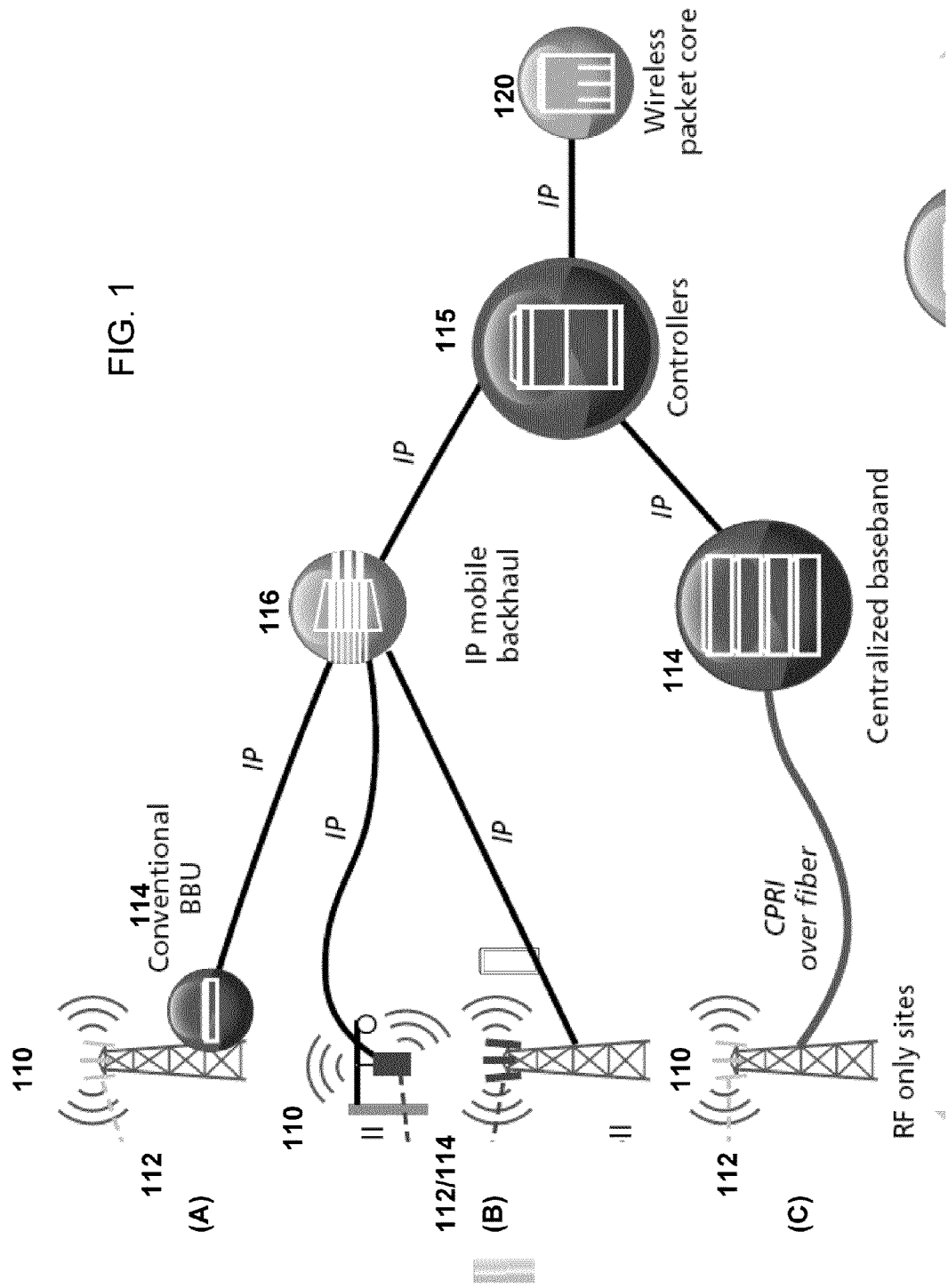
FIGS. 1(A)-(C) illustrates different embodiments of a base station architecture in a wireless communication system according to an example embodiment.

Various example embodiments will now be described more fully with reference to the accompanying drawings in which some example embodiments are shown. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

In the following description, illustrative embodiments will be described with reference to acts and symbolic representations of operations (e.g., in the form of flowcharts) that may be implemented as program modules or functional processes include routines, programs, objects, components, data structures, etc., that perform particular tasks or implement particular abstract data types and may be implemented using existing hardware at existing network elements. Such existing hardware may include one or more Central Processing Units (CPUs), digital signal processors (DSPs), application-specific-integrated-circuits, field programmable gate arrays (FPGAs), computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "generating" or "summing" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

The term "base station" may be considered synonymous to and/or referred to as a base transceiver station (BTS), NodeB, extended NodeB, evolved NodeB, femto cell, pico cell, access point, etc. and may describe equipment that provides the radio baseband functions for data and/or voice connectivity between a network and one or more user equipments. The term "user equipment" may be considered synonymous to, and may hereafter be occasionally referred to, as a mobile, mobile unit, mobile station, mobile user, subscriber, user, remote station, access terminal, receiver, etc., and may describe a remote user of wireless resources in a wireless communication network.

The embodiments provide a radio unit having a combination of an active antenna array for a high frequency band and a passive antenna array for a lower frequency band from a single antenna site in a cellular communication system. The passive antenna array creates an underlay cell having a lower frequency carrier that provides umbrella cell coverage or base coverage in a certain area of the single antenna site. The active antenna array creates at least one virtual sector with a higher frequency carrier within the base coverage area of the lower frequency carrier. The virtual sectors are created by the active antenna array, and each virtual sector is created with active antenna elements having a different antenna tilt. The sector coverage area of each virtual sector may be non-overlapping and smaller than the base coverage area. The two carriers may be aggregated in the overlapping coverage area (e.g., in the virtual sector coverage area), which provides for improved peak data rate and trunking efficiency. In the non-overlapping areas of the umbrella coverage, user equipments having data rates allowed by the lower frequency carrier and full mobility are supported. The coverage area of the virtual sectors can adapt autonomously by measuring the traffic loading in the baseband processing unit, and by varying the parameters such as digital tilt, beam pattern, and the transmit powers depending on the measurement.

Also, the embodiments include a radio unit having an active antenna array for the umbrella cell coverage, and another active antenna array for the creation of individual sectors.

The virtual sectors created by the active antenna array may be steered into different locations depending on the traffic distribution within the cell site. Also, the sector coverage area may be dynamically changed depending on the traffic distribution. These features are further explained below with reference to the figures.

FIGS. 1(A)-(C) illustrates different embodiments of a base station architecture in a wireless communication system according to example embodiments.

FIG. 1(A) illustrates a base station 110 having a radio unit 112 and a base band unit (BBU) 114, which is located in an area proximate to the cell tower of the base station. FIG. 1(B) illustrates a base station 110 having a combination of the radio unit 112 and the BBU 114. FIG. 1(C) illustrates a base station 110 having the radio unit 112 and a centralized BBU 114, which may be located away from an area including the cell tower of the base station 110. The centralized BBU 114 may be connected to the radio unit 112 via a communication cable (as shown in FIG. 1(C)) or connected to the radio unit 112 via any known wireless techniques. In one embodiment, the communication cable may be a Common Public Radio Interface (CPRI) over fiber. The base station architecture of the embodiments includes an interface for the transmission of control signals between the BBU 114 and the radio unit 112. Further, the base station 110 may include other components that are well known to one of ordinary skill in the art, for example.

The BBU 114 may include at least one processor and a storage unit. The at least one processor may be a digital signal processor (DSP), for example. Further, the BBU 114 may include other components that are well known to one of ordinary skill in the art such as application-specific-integrated-circuits, field programmable gate arrays (FPGAs), computers or the like. The BBU 114 may function similar to baseband units that are known in the art. However, the BBU 114 of the embodiments dynamically determines an adjustment to at least one parameter of the radio unit 112 based on monitoring information, which reflects the traffic distribution within the cell site of a respective base station. The details of the radio unit 112 and the BBU 114 are further described with reference to FIGS. 2-3.

The base station 110 may employ multiple-input-multiple-output (MIMO) techniques so that the multiple antenna elements in the radio unit 112 can transmit multiple independent and distinct signals to the user equipments on the same frequency band using spatially multiplexed channels of the air interfaces and/or different frequency bands using an RF modulation scheme in order to support multiple carriers. Also, the wireless communication system of the embodiments may support one or more wireless technologies (e.g., standards) such as Global System for Mobile Communications (GSM), Code Division Multiple Access (CDMA)/High Speed Packet Access (HSPA), Long Term Evolution (LTE), LTE-Advanced, and/or CDMA/EVDO, among others, for example.

The wireless communication system also includes an IP mobile backhaul 116 to provide IP connectivity to at least one controller 115 and a wireless packet core 120. The IP mobile backhaul 116, the at least one controller 115 and the wireless packet core 120 may operate according to methods that are well known for the transmission of data through the communication system. In addition, the wireless communication system may include other networking elements used for the transmission of data over the wireless communication system that are well known in the art. The wireless communication system of the embodiments may support multiple frequency carriers such as Advanced Wireless Services (AWS-1) and the 700L Band, for example. However, the embodiments encompass any type of frequency carrier (also called frequency band).

Each user equipment communicates with the base station 110 (and vice versa) of FIGS. 1(A)-(C) over at least one air interface. Techniques for establishing, maintaining, and operating the air interfaces between the user equipments and the base station 110 to provide uplink and/or downlink wireless communication channels between the base station 110 and the user equipments are known in the art, and in the interest of clarity only those aspects of establishing, maintaining, and operating the air interfaces that are relevant to the present disclosure will be discussed herein.

A cell site may serve a coverage area of the base station 110 called a cell, and the cell may be divided into a number of sectors, as further explained below. A base station 110 is associated with each cell site. Communication from the cell site of the base station 110 to the user equipment is referred to as the forward link or downlink. Communication from the user equipment to the cell site of the base station 110 is referred to as the reverse link or uplink.

The base station 110 may transmit and receive information from the core network 120 via the at least one controller 115 and the IP mobile backhaul 116. For example, in UMTS, a mobile switching center (MSC), radio network controller (RNC), which may access the internet network through a gateway support node (GSN) and/or access a public switched telephone network (PSTN) through a mobile switching center (MSC) to provide connectivity to the other base station 110. The RNC in UMTS networks provides functions equivalent to the Base Station Controller (BSC) functions in GSM networks.

Figure 2:
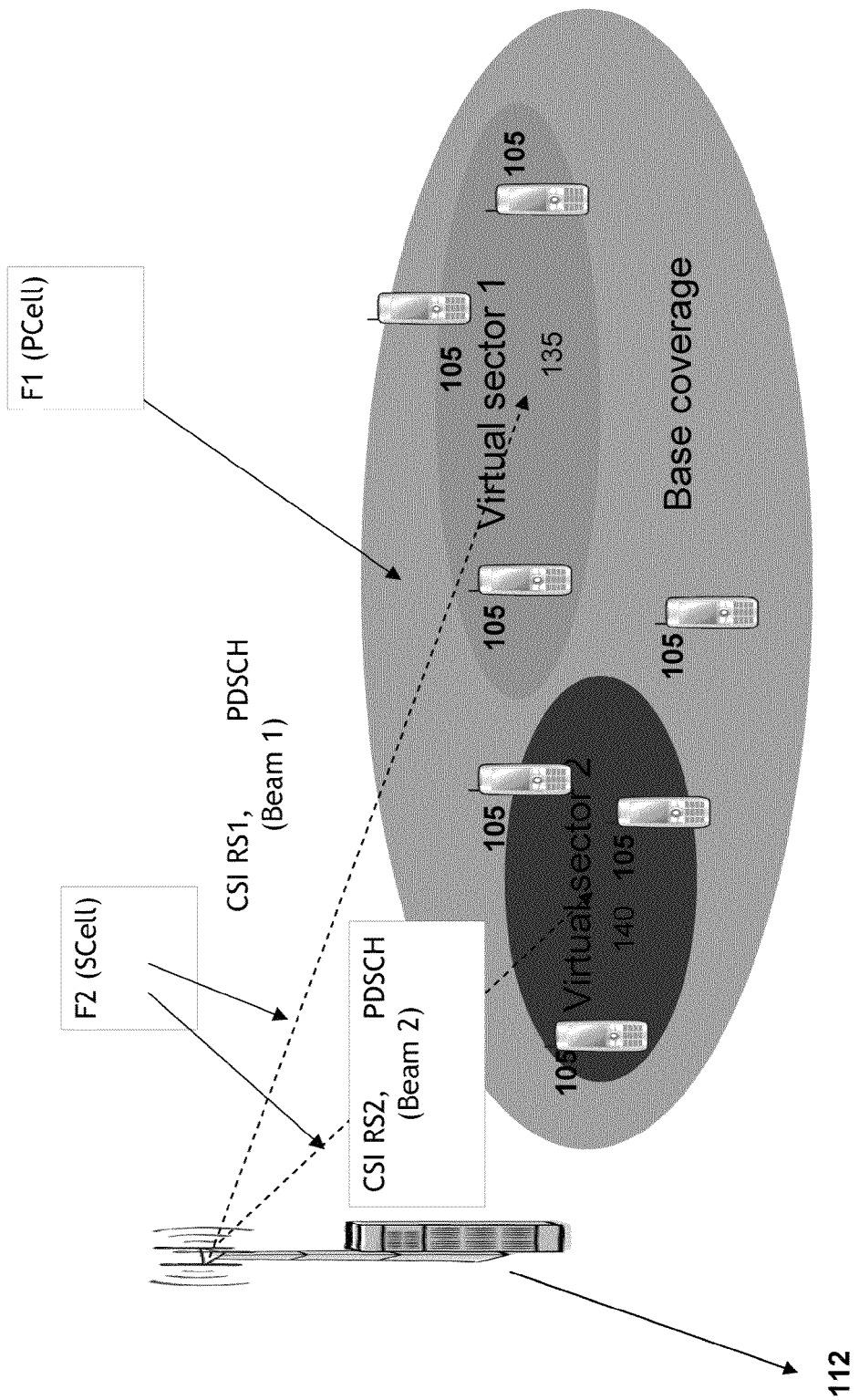
FIG. 2 illustrates a wireless communication system having a radio unit according to an example embodiment.

FIG. 2 illustrates a wireless communication system having a radio unit according to an example embodiment.

The wireless communication system includes the radio unit 112 (which is part of the base station 110) that creates an umbrella cell (e.g., PCell) to provide wireless coverage for user equipments 105 on a first frequency carrier (F1) in the base coverage area of the cell site. Further, the radio unit 112 creates virtual sectors for providing wireless coverage for the user equipments on a second frequency carrier (e.g., F2) in sector coverage areas within the base coverage area. The second frequency carrier may be higher than the first frequency carrier. The radio unit 112 is further explained with reference to FIG. 3.

FIG. 3 illustrates a radio unit 112 according to an embodiment. The radio unit 112 includes an active antenna array 150, a passive antenna array 155, a plurality of transceivers 160 that are associated with the active antenna array 150, a plurality of radio frequency (RF) filters 165, and a central unit 170. Also, instead of the passive antenna array 155 providing umbrella coverage, the embodiments encompass using another active antenna array 150 to provide umbrella coverage.

The central unit 170 controls the active antenna array 150 based on control signals transmitted from the BBU 114. For example, the central unit 170 may receive at least one control signal from the BBU 114, which provides adjustment information for adjusting at least one parameter of the active antenna array 150. Based on the at least one control signal, the central unit 170 dynamically adjusts the active antenna array 150 according to the adjustment information. These features are further explained below. The central unit 170 may include at least one processor and a storage unit. The at least one processor may be a digital signal processor (DSPs), for example. Further, the central unit 170 may include other components that are well known in the art such as application-specific-integrated-circuits, and/or field programmable gate arrays (FPGAs).

The transceivers 160 and the plurality of RF filters 165 operate according to methods that are well known to one of ordinary skill in the art. However, low-power integrated transceivers are preferably used with the radio unit 112 of the embodiments. Furthermore, the radio unit 112 may include the BBU 114 as shown in FIG. 1(B). Also, the radio unit 112 may include other components that are well known to one of ordinary skill in the art such as a heat sink, for example. According to the embodiments, the active antenna array 150 and the passive antenna array 155 are provided on the single antenna site.

The active antenna array 150 includes a plurality of active antenna elements. The plurality of active antenna elements may be arranged in any type of structural arrangement known in the art such as a circular array or vertical array, for example. In one embodiment, the plurality of active antenna elements may be arranged as a single column cross-pol design for MIMO 2×2 in azimuth, dual column cross-pol design for evolution to 4×2 MIMO or dual beams in azimuth, or a combination of azimuth and elevation for 3D MIMO/BF for improved flexibility, for example. The passive antenna array 155 includes a plurality of passive antenna elements. The plurality of passive antenna elements may be arranged in any type of structural arrangement known in the art such as a circular array, or vertical array, for example.

In one embodiment, the plurality of passive antenna elements are arranged to provide the wireless coverage for the user equipments on the first frequency carrier in the base coverage area of the cell site, as shown in FIG. 2. In other words, the passive antenna array 155 creates an underlay cell with a lower frequency carrier providing the base coverage area. The underlay cell provides voice and low data rate traffic for the user equipments 105 in the base coverage area, as well as seamless coverage and mobility. However, as indicated above, the embodiments encompass using a plurality of active antenna elements for the underlay cell instead of the passive antenna array 155.

In one embodiment, the plurality of active antenna elements are arranged to create at least one sector for providing wireless coverage for the user equipments on the second frequency carrier in the sector coverage area within the base coverage area created by the passive antenna array 155, as shown in FIG. 2.

FIG. 2 illustrates two virtual sectors—a first virtual sector 135 and a second virtual sector 140. However, the embodiments encompass any number of virtual sectors. The number of virtual sectors may be one or more depending on the traffic distribution inside the cell site and the capability of the active antenna array. The creation of virtual sectors by the arrangement of active antenna elements is well known to one of ordinary skill in the art. For example, the virtual sectors are created by the active antenna array 150 by varying the vertical antenna tilt, azimuth angle, and beam pattern. In one embodiment, the virtual sectors may be created in hot spot areas such as shopping malls, building floors, campuses, or stadiums, for example.

Referring to FIG. 2, the first virtual sector 135 provides wireless coverage for the user equipments 105 in its sector coverage area. The sector coverage area of the first virtual sector 135 may be smaller than the base coverage area. Similarly, the second virtual sector 140 provides wireless coverage for the user equipments 105 in its sector coverage area, which may be smaller than the base coverage area. The virtual sectors are identified by a separate Channel State Information-Reference Signal (CSI-RS), which is a type of pilot signal, and beamformed High-Speed Physical Downlink Shared Channel (PDSCH) for the user equipments 105 that are scheduled within the virtual sector.

In other words, radio unit 112 creates the virtual sectors by generating beamforming signals. Beam 1 corresponds to the first virtual sector 135, and Beam 2 corresponds to the second virtual sector 140. Beamforming over the active antenna array 150 to create one or more beamforming signals are well known in the art.

The umbrella cell for the base coverage area is the PCell for all user equipments 105 in the base coverage area. The overlaid virtual sectors are identified by separate Cell IDs from the PCell, referred to as the SCell. There can be multiple non-overlapping virtual sectors within the PCell coverage area. Multiple virtual sectors can have identical SCell IDs. In other words, a single logical baseband unit (e.g., the baseband unit 114) manages the physical cell ID, and assigns the same physical cell ID for all virtual sectors. As such, there is no handoff requirement between the beams of the sectors.

According to an embodiment, the baseband unit 114 aggregates the first frequency carrier with the second frequency carrier in the overlapping areas (e.g., the first virtual sector 135 and the second virtual sector 140). For example, for user equipments 105 within either the first virtual sector 135 or the second virtual sector 140, the first frequency carrier is aggregated with the second frequency carrier, which creates improved peak data rate and trunking efficiency. Carrier aggregation is a 3GPP LTE-Advanced technology, allowing user equipments 105 to be scheduled in multiple frequencies simultaneously. In the remaining areas (e.g., the non-overlapping areas), the user equipments experience the data rate allowed by the first frequency carrier (e.g., the lower frequency carrier), and full mobility is supported.

With cross carrier scheduling, for the user equipments 105 in the overlapping areas, the radio unit 112 may transmit control signals using the first frequency carrier and the radio unit 112 may transmit the data signals using the second frequency carrier by configuring the control region of the second carrier to zero. As such, the entire spectrum of the higher frequency carrier may be used for user data transmissions.

In another embodiment, the control region may be configured in both carriers. As such, control signal loading may be shared between the two carriers.

Also, by using the active antennas array 150 for the high frequency carrier, the baseband unit 114 may control the location of the sectors and the size of the sector so that the virtual sectors may be steered toward hot-spot areas, where more loading occurs. In other words, loading between the virtual sectors are managed dynamically depending on the traffic distribution. Furthermore, the hot spot areas with larger traffic loading may be served with higher transmit power, as further described below.

The BBU 114 may evaluate the traffic distribution of the cell site based on monitoring information received from the core network 120. The monitoring information may include information that indicates the amount of user equipments 105 in the base coverage area, as well as within each sector coverage area.

The BBU 114 dynamically adjusts the location of the sector coverage areas or dynamically adjusts the size of the sector coverage areas based on the monitoring information. For example, based on the traffic distribution indicated in the monitoring information, the BBU 114 may change the location of the sector coverage areas by adjusting at least one antenna parameter. The antenna parameters may include tilt, azimuth angle, and antenna pattern of the active antenna elements. After determining the adjustment of the antenna parameters, the BBU 114 may transmit at least one control signal that includes the adjustment information to central unit 170 of the radio unit 115. The adjustment information indicates an adjustment to the at least one antenna parameter.

Referring to FIG. 3, the central unit 170 of the radio unit 112 receives one or more control signals from the BBU 114, and adjusts the active antenna elements according to the adjustment information contained in the control signals. As such, the beam pattern and the tilt of the virtual sectors are optimized depending on traffic loading. With dynamic beam steering capability of the active antenna array 150, the virtual sectors may adapt to spatial variation of traffic loading. When the traffic loading changes from one area to another, the virtual sectors can steer following the traffic loading without disrupting mobility. The user equipments 105 are still connected to the PCell coverage area while moving in the base coverage area.

Also, the BBU 114 may change the size of the sector coverage areas by adjusting the pilot power of the sectors. For example, the BBU 114 may transmit at least one control signal that includes adjustment information indicating a change to the pilot power of a sector(s). Referring to FIG. 3, the central unit 170 of the radio unit 112 receives the one or more control signals from the BBU 114, and adjusts the power of the active antenna elements according to the adjustment information contained in the control signals.

Referring back to FIGS. 1(A)-(C), the BBU 114 may be included in the base station 110 in the proximate location of the cell tower (e.g., FIG. 1(A)). Alternatively, the BBU 114 may be included in the radio unit 112, as shown in FIG. 1(B). In this case, the radio unit 112 includes a separate BBU 114 or the central unit 170 is configured with the functions of the BBU 114. Also, the BBU 114 may be located away from the cell tower of the base station 110, and the adjustment information may be transmitted to the radio unit 114, as shown in FIG. 1(C). Also, the base station 110 includes an interface between the BBU 114 and the active antenna array 150 for carrying the adjustable parameters to the radio unit 112.

The base station 110 includes a scheduling function that is responsible for time/frequency resource allocation in the virtual sectors, allocation of the virtual sector to the user equipment 105, and assigning power to the user equipment 105. The base station 110 of the embodiments utilizes a single scheduling mechanism that manages the scheduling of users for each virtual sectors.

Variations of the example embodiments are not to be regarded as a departure from the spirit and scope of the example embodiments, and all such variations as would be apparent to one skilled in the art are intended to be included within the scope of this disclosure.

What is claimed:

1. A radio unit for supporting dual bands, the radio unit comprising:
    a first antenna array including a plurality of first antenna elements, the plurality of first antenna elements being arranged to provide wireless coverage for user equipments on a first frequency carrier in a first coverage area of a cell site;
    a second antenna array including a plurality of second antenna elements, the plurality of second antenna elements being arranged to create at least one sector for providing wireless coverage for the user equipments on a second frequency carrier in a second coverage area enveloped by the first coverage area, wherein the first carrier frequency and the second carrier frequency are different frequencies; and
    a central unit configured to dynamically adjust one of a location of the second coverage area within the first coverage area and a size of the second coverage area, wherein the first antenna array transmits control signals in the first and second coverage areas using the first frequency carrier and the second antenna array transmits data signals using the second frequency carrier for the user equipments in the second coverage area, the second frequency carrier not being configured to transmit control signals.

2. The radio unit of claim 1, wherein the central unit dynamically adjusts the location of the second coverage area within the first coverage area based on at least one control signal, the at least one control signal including adjustment information indicating an adjustment to at least one antenna parameter of the second antenna array.

3. The radio unit of claim 2, wherein the at least one parameter includes tilt, azimuth angle, and antenna pattern of the second antenna elements.

4. The radio unit of claim 1, wherein the central unit dynamically adjusts the size of the second coverage area based on at least one control signal, the at least one control signal including adjustment information indicating an adjustment to a pilot power of the at least one sector.

5. The radio unit of claim 1, wherein the plurality of second antenna elements are arranged to create a plurality of sectors, each sector for providing non-overlapping wireless coverage for the user equipments on the second frequency carrier in a corresponding second coverage area within the first coverage area, each sector of the plurality of sectors having a same cell identification number.

6. The radio unit of claim 1, wherein further comprising:
    a baseband unit configured to determine an adjustment to at least one antenna parameter of the first antenna array based on traffic distribution in the cell site and transmit adjustment information to the central unit, the adjustment information indicating the adjustment to at least one antenna parameter.

7. The radio unit of claim 6, the central unit dynamically adjusts one of the location of the second coverage area within the first coverage area and the size of the second coverage area based on the adjustment information.

8. The radio unit of claim 1, wherein the second frequency carrier is higher than the first frequency carrier, the first antenna array is a passive antenna array, and the second antenna array is an active antenna array.

9. A base station for carrier aggregation, the base station comprising:
    a radio unit including,
        a first antenna array including a plurality of first antenna elements, the plurality of first antenna elements being arranged to provide wireless coverage for user equipments on a first frequency carrier in a first coverage area of a cell site;
        a second antenna array including a plurality of second antenna elements, the plurality of second antenna elements being arranged to create at least one sector for providing wireless coverage for the user equipments on a second frequency carrier in a second coverage area enveloped by the first coverage area, wherein the first carrier frequency and the second carrier frequency are different frequencies; and a baseband unit configured to dynamically adjust one of a location of the second coverage area within the first coverage area and a size of the second coverage area, wherein the radio unit transmits control signals in the first and second coverage areas using the first frequency carrier and the radio unit transmits data signals using the second frequency carrier for the user equipments in the second coverage area, the second frequency carrier not being configured to transmit control signals.

10. The base station of claim 9, further comprising:

an interface between the baseband unit and the second antenna array for transmitting adjustable antenna parameters to the radio unit for the dynamic adjustment.

11. The base station of claim 9, wherein the baseband unit is configured to dynamically adjust one of the location of the second coverage area within the first coverage area and the size of the second coverage area based on monitoring information, the monitoring information indicating traffic distribution in the cell site.

12. The base station of claim 9, wherein the baseband unit is configured to aggregate the first frequency carrier with the second frequency carrier in an overlapping area between the first coverage area and the second coverage area.

13. The base station of claim 9, wherein the baseband unit is configured to dynamically adjust the location of the second coverage area within the first coverage area by adjusting at least one antenna parameter of the second antenna array.

14. The base station of claim 13, wherein the at least one parameter includes tilt, azimuth angle, and antenna pattern of the second antenna elements.

15. The base station of claim 9, wherein the baseband unit is configured to determine an adjustment to at least one antenna parameter of the second antenna array, and transmit adjustment information indicating the adjusted at least one antenna parameter to the radio unit.

16. The base station of claim 9, wherein the plurality of second antenna elements are arranged to create a plurality of sectors, each sector for providing non-overlapping wireless coverage for the user equipments on the second frequency carrier in a corresponding second coverage area within the first coverage area.

17. The base station of claim 16, wherein each sector of the plurality of sectors has a same cell identification number.

18. The base station of claim 9, wherein the second frequency carrier is higher than the first frequency carrier, the first antenna array is a passive antenna array, and the second antenna array is an active antenna array.

* * * * *